US006210816B1

(12) United States Patent
Malhotra

(10) Patent No.: US 6,210,816 B1
(45) Date of Patent: Apr. 3, 2001

(54) TRANSLUCENT XEROGRAPHIC RECORDING SUBSTRATES

(75) Inventor: Shadi L. Malhotra, Mississauga (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/276,961

(22) Filed: Mar. 26, 1999

(51) Int. Cl.$^7$ .................................................. B32B 9/00

(52) U.S. Cl. .......................... 428/690; 428/195; 428/480

(58) Field of Search ........................ 430/47, 97; 428/690, 428/195, 480

(56) References Cited

U.S. PATENT DOCUMENTS

| | | | | |
|---|---|---|---|---|
| 3,790,435 | | 2/1974 | Tanba et al. | 161/160 |
| 4,705,719 | | 11/1987 | Yamanaka et al. | 428/323 |
| 4,795,676 | | 1/1989 | Maekawa et al. | 428/328 |
| 4,956,225 | | 9/1990 | Malhotra | 428/216 |
| 4,997,697 | | 3/1991 | Malhotra | 428/195 |
| 5,075,153 | | 12/1991 | Malhotra | 428/207 |
| 5,145,749 | | 9/1992 | Matthew | 428/511 |
| 5,202,205 | | 4/1993 | Malhota | 430/17 |
| 5,302,439 | | 4/1994 | Malhotra et al. | 428/195 |
| 5,451,458 | | 9/1995 | Malhotra | 428/412 |
| 5,482,812 | * | 1/1996 | Hopper et al. | 430/137 |
| 6,096,443 | * | 8/2000 | Malhotra et al. | 428/690 |
| 6,100,022 | * | 8/2000 | Inoue et al. | 430/617 |

* cited by examiner

*Primary Examiner*—Hoa Van Le
*Assistant Examiner*—Amanda C. Walke
(74) *Attorney, Agent, or Firm*—E. O. Palazzo

(57) ABSTRACT

Disclosed is a translucent recording sheet comprising a transparent substrate coated with a transparent toner receiving layer on the front side and a pigmented opaque coating on the back side. The toner-receiving layer is comprised of a polymeric binder, an antistatic compound, and a toner wetting compound, a lightfast compound, a traction compound and an optional biocide. The pigmented coating is comprised of a polymeric binder, an antistatic compound, and a luminescence imparting compound, a lightfast compound, a pigment and an optional biocide.

36 Claims, No Drawings

TRANSLUCENT XEROGRAPHIC RECORDING SUBSTRATES

PENDING APPLICATIONS AND PATENTS

Recording sheets are illustrated in U.S. Ser. No. 09/277,691, filed concurrently herewith, the disclosure of which is totally incorporated herein by reference. The recording components of the present invention may be selected for the ink processes, such as thermal ink jet, drop on demand printing, continuous ink jet, acoustic ink yet, and the like, as illustrated in U.S. Pat. Nos. 5,931,995; 5,902,390; 5,922,117 and 5,958,199, the disclosures of which are totally incorporated herein by reference and preferably for dry toner processes wherein the toner is comprised of for example known components of a binder resin, colornat, optional charge additives, waxes, and toner surface additives.

BACKGROUND OF THE INVENTION

The present invention is directed to xerographic recording components such as sheets for use in creating simulated photographic-quality images or prints with nonphotographic imaging such as xerography printing and/or copying. More specifically, the present invention is directed to creating simulated, photographic-quality prints on a translucent or transparent plastic recording sheet with pigmentless toner receiving layers containing polyester resins and polyester compatible toner wetting additives on the front side of a transparent substrate, and on the back side thereof a coating or layer of pigmented coatings containing luminescence imparting materials and liquid crystalline esters and which back side can be written upon with a pen, pencil, xerography and ink jet printing.

PRIOR ART

Disclosed in U.S. Pat. No. 3,790,435 are synthetic papers with acceptable foldability of a nonlaminated structure of one thermoplastic resin film or a laminated structure of at least two thermoplastic resin films. Each of the films is stretched or molecularly oriented, and one or more of the films contain a fine inorganic filler to provide paperness of the film. According to this patent, some of the films may contain amounts of poly (styrene) as a foldability improving compound.

There is disclosed in U.S. Pat. No. 4,705,719 a synthetic paper with a resin film comprising a base layer (1a) of a biaxially stretched thermoplastic resin film, and a laminate provided on at least one of the opposite surfaces of the base layer, the laminate including a paper-line layer; (1b) a surface layer, and (1c) a paper like layer containing a uniaxially stretched film of thermoplastic resin containing 8 to 65 parts by weight of inorganic fine powder. Also known is an electrostatic recording material comprised of a multilayered sheet support with an electroconductive layer and dielectric layers formed thereon, reference, for example, U.S. Pat. No. 4,795,676.

Moreover, there is disclosed in U.S. Pat. No. 5,075,153 a never-tear paper comprised of a plastic supporting substrate, a binder layer comprised of polymers selected from the group consisting of (1) hydroxypropyl cellulose; (2) poly (vinyl alkylether); (3) vinylpyrrolidone/vinylvinylacetate; (4) quaternized vinylpyrrolidone/dialkyl aminoethyl/methacrylate; (5) poly(vinylpyrrolidone); (6) poly (ethyleneimine) and mixtures thereof; and a pigment, or pigments, and an ink receiving layer.

Xerographic substrates such as transparencies and papers used in various printing and imaging processes are known, reference for example, U.S. Pat. No. 5,145,749 which discloses erasable coatings for xerography paper which coatings comprise for example, a pigment such as calcium carbonate in a binder such as an aqueous emulsion of an acrylic polymer.

U.S. Pat. No. 4,956,225 discloses a transparency suitable for electrographic and xerographic imaging which transparency comprises a polymeric substrate with a toner receptive coating on one surface thereof comprising blends selected from the group consisting of poly(ethylene oxide) and carboxymethyl cellulose; poly(ethylene oxide), carboxymethyl cellulose, and hydroxypropyl cellulose; poly (ethyleneoxide) and vinylidenefluoride/hexafluoro propylene copolymer; poly (chloroprene) and poly(alpha-methyl styrene); poly(caprolactone), poly(alpha-methylstyrene); poly(vinylisobutylether) and poly(alpha-methylstyrene); poly(caprolactone) and poly(p-isopropyl alpha-methylstyrene); blends of poly(1,4-butylene adipate) and poly(alpha-methyl styrene); chlorinated poly(propylene) and poly(alpha-methylstyrene); chlorinated poly(ethylene) and poly(alpha-methyl styrene); and chlorinated rubber and poly(alpha-methylstyrene).

U.S. Pat. No. 4,997,697 discloses a transparent substrate material for receiving or containing an image which comprises a supporting substrate base, an antistatic polymer layer coated on one or both sides of the substrate and comprising hydrophilic cellulosic components, and a toner receiving polymer layer contained on one or both sides of the antistatic layer, which polymer comprises hydrophobic cellulose ethers, hydrophobic cellulose esters, or mixtures thereof, and wherein the toner receiving layer can contain adhesive components.

U.S. Pat. No. 5,202,205, the disclosure of which is totally incorporated herein by reference, discloses a transparent substrate material for receiving or containing an image comprising a supporting substrate, an ink toner receiving coating composition on both sides of the substrate and comprising an adhesive layer and an antistatic layer contained on two surfaces of the adhesive layer, which antistatic layer comprises mixtures or complexes of metal halides or urea compounds both with polymers containing oxyalkylene segments.

U.S. Pat. No. 5,302,439, the disclosure of which is totally incorporated herein by reference, discloses a recording sheet, which comprises, (a) a substrate; (b) a coating on the substrate which comprises a binder and a material having a melting point of less than about 65° C. and a boiling point of greater than 150° C. and selected from the group consisting of alkyl phenones, alkyl ketones, halogenated alkanes, alkyl amines, alkyl anilines, alkyl diamines, alkyl alcohols, alkyl diols, halogenated alkyl alcohols, alkane alkyl esters, saturated fatty acids, unsaturated fatty acids, alkyl aldehydes, alkyl anhydrides, alkanes, and mixtures thereof; (c) an optional traction compound; and (d) an optional antistatic compound.

U.S. Pat. No. 5,451,458, the disclosure of which is totally incorporated herein by reference, discloses a recording sheet, which comprises, (a) a substrate; (b) a coating on the substrate, which comprises, (1) a binder selected from the group consisting of (A) polyesters; (B) polyvinyl acetals; (C) vinyl alcohol-vinyl acetal copolymers; (D) polycarbonates; and (E) mixtures thereof; and (2) an additive having a melting point of less than about 65° C. and a boiling point of more than about 150° C. and selected from the group consisting of: (A) furan derivatives; (B) cyclic ketones; (C) lactones; (D) cyclic alcohols; (E) cyclic anhydrides; (F) acid esters; (G) phosphine oxides; and (H) mixtures thereof; (c) an optional filler; (d) an optional antistatic compound; and (e) an optional biocide. Also disclosed is a process for generating images which comprises: (1) generating an electrostatic latent image on an imaging member in an imaging apparatus; (2) developing the latent image with a toner comprised of a colorant and a resin selected from the group consisting of (A) polyesters; (B) polyvinyl acetals; (C) vinyl alcohol-vinyl acetal copolymers; (D) polycarbonates; and (E) mixtures thereof; and (3) transferring the developed image to a recording sheet which comprises: (A) a substrate; (B) a coating on the substrate which comprises: (I) a binder selected from the group consisting of: (a) polyesters; (b) polyvinyl acetals; (c) vinyl alcohol-vinyl acetal copolymers; (d) polycarbonates; and (e) mixtures thereof; and (II) an additive having a melting point of less than about 65° C. and a boiling point of more than about 150° C. and selected from the group consisting of: (a) furan derivatives; (b) cyclic ketones; (c) lactones; (d) cyclic alcohols; (e) cyclic anhydrides; (f) acid esters; (g) esters; (h) phenones; (i) phosphine oxides; and (j) mixtures thereof; (C) an optional filler; (D) an optional antistatic compound; and (E) an optional biocide.

The disclosures of each of the above patents are totally incorporated herein by reference.

While known plastic recording sheets are suitable for their intended purposes, a need remains for improved xerographic recording sheets with improved image waterfastness and lightfastness. There is also a need for coated xerographic recording sheets with improved traction to thereby avoid or minimize problems when these sheets are fed into various printers and copiers. Additionally, there is a need for xerographic recording sheets with enhanced optical density, minimum show through, and less or minimal intercolor bleed. Further, there is a need for translucent xerographic recording sheets for electrostatic printing processes such as electrophotography, which exhibit excellent toner fix of the image to the sheet. Additionally, there is a need for xerographic recording sheets, which exhibit reduced curl and excellent toner fix when used for electrostatic printing.

SUMMARY OF THE INVENTION

It is an feature of the present invention to provide xerographic recording sheets with the advantages illustrated herein.

It is another feature of the present invention to provide improved xerographic recording sheets suitable for use in electrostatic printing processes.

It is another feature of the present invention to provide translucent xerographic recording sheets with improved traction.

It is yet another feature of the present invention there is provided improved-coated xerographic recording sheets with reduced interlocutor bleed between various colors.

Still another object of the present invention is to provide translucent xerographic recording sheets for electrostatic printing processes such as electrophotography.

It is another feature of the present invention to provide translucent xerographic recording sheets which exhibit reduced curl, excellent to superior toner fix, high gloss and minimum scratching, and scuffing of the images when used for electrostatic printing.

DETAILED DESCRIPTION OF THE INVENTION

Aspects of the present invention relate to a recording component comprising a substrate situated between a hydrophobic toner receiving layer and an opaque colorant luminescent layer, a recording component wherein the substrate is transparent and is selected from the group consisting of (1) polyethylene terephthalate; (2) polyethylene naphthalates; (3) polysulfones; (4) cellulose triacetate; (5) polyvinylchloride; and (6) polypropylene; a recording component wherein the toner, and also ink receiving layer is comprised of a hydrophobic polymeric binder, an antistatic compound, a toner wetting compound, a lightfastness compound, a lightfastness antioxidant, a lightfastness ozonant, and a filler; a recording component wherein the transparent toner receiving layer is comprised of from about 55 parts by weight to about 83 parts by weight of a hydrophobic binder; the toner wetting compound is present in an amount of from about 22 parts by weight to about 10 parts by weight; the antistatic compound is present in an amount of from about 10 parts by weight to about 1 part by weight; the lighffastness compound is present in an amount of from about 6 parts by weight to about 0.5 part by weight; the lightfastness antioxidant is present in an amount of from about 3 parts by weight to about 0.25 part by weight; the lightfastness antiozonant is present in an amount of from about 3 parts by weight to about 0.25 part by weight; the filler is present in an amount of from about 1 part by weight to about 5 parts by weight, and the total of said components is about 100 percent; a recording component wherein the polymeric binder is selected from the group consisting of (1) polyethylene terephthalate resins; (2) polybutylene terephthalate ester resins; (3) rosin modified maleic polyester resins; (4) polyester-ether resins; and (5) polyester-co-polycarbonate; a recording component wherein the toner wetting compound optionally present in amounts of from about 22 parts by weight to about 10 parts by weight is comprised of lactam compounds of (1) β-propiolactam; (2) (±)-2-azabicyclo [2.2.1] hept-5-en-3-one; (3) γ-valerolactam; (4) N-methyl caprolactam; or (5) N-vinylcaprolactam; a recording component wherein the toner wetting compound is (1) N-ethylmaleimide; (2) 2-dodecyl-N-(2,2,6,6-tetramethyl-4-piperidinyl) succinimide; (3) α-methyl-α-propylsuccinimide; (4) diethyl (phthalimido methyl) phosphonate; or (5) 1-benzyl-3-methyl-2-thiourea; a recording component wherein the toner wetting compound is (1) 2-(benzylamino) cyclohexane methanol; (2) N-benzylmethylamine; (3) N-benzyl-α-methyl benzyl amine; (4) N-benzylethanolamine; (5) 3-(N-benzyl-N-methylamino)-1,2-propanediol; or (6) benzyl-L-cysteinol; a recording component wherein the toner wetting compound is (1) benzyl-2-bromo acetate; (2) benzylbutyrate; (3) benzylcinnamate; (4) benzyl(S)-lactate; (5) benzyl-N-hydroxycarbamate; or (6) benzyl-N-(2-hydroxyethyl) carbamate; a recording component wherein the toner wetting compound is (1) 1-benzyl-4-hydroxypiperidine; (2) 1-benzylimidazole; (3) 1-benzyl-2-methyl imidazole; (4) 1-benzyl-3-pyrrolidinol; or (5) 1-benzyl-3-pyrrolidinone; a recording component wherein the toner wetting compound is (1) benzyloxy benzaldehyde; (2) benzyloxy benzylalcohol; (3) benzyloxy-methoxy benzaldehyde; (4) 4-benzyloxy-3-methoxy benzylalcohol; or (5) 4'-benzyloxy-2'-methoxy-3'-methylacetophenone; a recording component wherein the antistatic compound optionally present in an amount of from about 10 parts by weight to about 1 part by weight is selected form the group consisting of (1) (4-ethoxybenzyl) triphenyl phosphonium bromide; (2) ethyl triphenyl phosphonium bromide; (3) (ethoxycarbonylmethyl) dimethyl sulfonium bromide; (4) 1-propylpyridiniumbromide; and (5) 2-propylisoquinolinium bromide; a recording component wherein the thickness of the toner receiving layer is from about 0.1 to about 25 microns; a recording component wherein the opaque colorant layer is comprised of a polymeric binder, an antistatic compound, a colorant, a luminescence imparting compound, an optional lightfastness compound, and an optional biocide; a recording component wherein the colorant layer is comprised of from about 68 parts by weight to about 5 parts by weight of a polymeric binder; from about 30 parts by weight to about 1 part by weight of a luminescence imparting compound; from about 0.5 parts by weight to about 10 parts by weight of an antistatic compound; from about 0.5 parts by weight to about 10 parts by weight of a lightfastness compound; and from about 0.5 parts by weight to about 74 parts by weight of colorant; a recording component wherein the binder is selected from the group consisting of (1) a rubber latex; (2) a polyester latex; (3) an ethylene-vinyl acetate copolymer emulsion; (4) an acrylic-vinyl acetate copolymer emulsion; and (5) a vinyl acrylic terpolymer latex; a recording component wherein the binder is selected from the group consisting of (1) a poly(ethylene-co-methylacrylate-co-glycidyl methacrylate) copolymer; (2) a poly(ethylene-co-ethylacrylate-co-maleic anhydride) copolymer; (3) a poly (ethylene-co-vinyl acetate-co-carbon monoxide) copolymer; (4) a poly(ethylene-co-vinylacetate)-graft-poly (maleicanhydride) copolymer; and (5) a polystyrene-block-poly(ethylene-random-butylene)-block-polystyrene; a recording component wherein the luminescent compound is selected from the group consisting of inorganic phosphors, organic phosphors and polymeric phosphors; a recording component wherein the luminescent compound is optionally present in an amount of from about 30 parts by weight to about 1 parts by weight and is selected from the group consisting of (1) (−)2-methylbutyl-4-(4'-methoxy benzylidene amino) cinnamate; (2) (S)-(+)-2-methylbutyl-4-(4-decyloxy benzylidene amino) cinnamate; (3) ethyl 4-ethoxybenzyl-4'-amino cinnamate; (4) 4-[(S)-(−)-2-ethoxy propoxy]phenyl 4-(decyloxy) benzoate; (5) 4-[(R)-(−)2-chloro-3-methyl butyryloxy]phenyl-4-(decyloxy) benzoate; (6) 4-[(S)-(+)2-chloro-3-methyl butyryloxy]phenyl 4-(decyloxy) benzoate); (7) 4-[(S)-(+)-(4-methyl hexyloxy] phenyl 4-(decyloxy) benzoate; (8) (R)-4-[(1-methylheptyloxy)carbonyl]phenyl4'-octyloxy-4-biphenyl carboxylate; (9) (S)-4-[(1-methylheptyloxy)carbonyl] phenyl-4'-octyloxy-4-biphenyl carboxylate; (10) cholesteryl oleate; and (11) cholesteryl oleyl carbonate; a recording component wherein the thickness of the colorant layer is from about 0.1 to about 25; a recording component comprised of a substrate situated between a first hydrophobic toner receiving layer and a second colorant luminescent layer; a recording component wherein the toner receiving layer is comprised of a hydrophobic polymeric binder, an antistatic compound, a toner wetting compound, a lightfastness compound, a lightfastness antioxidant, a lightfastness ozonant, and a filler; a recording component wherein the lightfastness compound is didodecyl-3,3'-thio dipropionate, (2) tris(4-tert-butyl-3-hydroxy-2,6-dimethyl benzyl) isocyanurate, (3) 1,3,5-trimethyl-2,4,6-tris(3,5-ditert-butyl-4-hydroxybenzyl) benzene, (4) N,N'-β,β'-naphthalene-4-phenylene diamine, or (5) 4,4'-methylene-bis(dibutyl dithio-carbamate), (6) 2,2,4-trimethyl- 1,2-hydroquinoline; a recording sheet wherein the lightfastness compound is didodecyl-3,3'-thio dipropionate, (2) tris(4-tert-butyl-3-hydroxy-2,6-dimethyl benzyl) isocyanurate, (3) 1,3,5-trimethyl-2,4,6-tris(3,5-di-tert-butyl-4-hydroxybenzyl) benzene, (4) N,N'-β,β'-naphthalene-4-phenylene diamine, or (5) 4,4'-methylene-bis(dibutyl dithio-carbamate), (6) 2,2,4-trimethyl-1,2-; a recording component wherein the antioxidant is 1) N,N'-bis(1,4-dimethyl pentyl)-4-phenylene diamine, (2) 2,4,6-tris-(N-1, 4-dimethylpentyl-4-phenylene diamino)-1,3,5-triazine, (3) 6-ethoxy-1,2-dihydro-2,2,4-trimethyl quinoline, or (4) bis-(1,2,3,6-tetrahydrobenzaldehyde) pentaerythritol acetal; a recording sheet wherein the colorant luminescent layer is comprised of a polymer binder, a luminescent compound, an antistatic compound, a lighffastness compound and a filler; and a plastic recording sheet comprised of a substrate or base sheet or substrate containing a coating on both lateral surfaces thereof.

Various suitable substrates can be selected for the recording components of the present invention. Examples of substrates include polyesters, including MYLAR®, polyethylene terephthalate, E.I. DuPont de Nemours & Company; MELINEX®, polyethylene terephthalate, Imperial Chemicals, Inc.; and CELANAR®, polyethylene terephthalate, Celanese Corporation; polyethylene naphthalates, such as Kaladex PEN films, Imperial Chemical Industries; polycarbonates, such as LEXAN®, General Electric Company; polysulfones, such as those Union Carbide Corporation; polyether sulfones, UDEL®, Union Carbide Corporation; polyether sulfones, VICTREX®, ICI Americas Incorporated; poly (arylene sulfones); cellulose triacetate; polyvinylchloride; cellophane; polyvinyl fluoride; polyimides; and the like, with polyester, such as MYLAR®, being preferred primarily because of its availability and relatively low cost.

The substrate of the recording sheet can be of any effective thickness. Typical thicknesses for the substrate are, for example, from about 50 to about 500 microns, and preferably from about 100 to about 125 microns, although the thickness can be outside these ranges.

The substrate, preferably transparent is coated on one side with a toner receiving coating comprised of for example, a polymeric binder or mixtures thereof, a toner wetting compound, an antistatic compound, a lightfastness compound, and a filler which primarily functions as a traction compound. The toner receiving coating is comprised, for example, of from about 23 parts by weight to about 87 parts by weight, and preferably from about 55 parts by weight to about 83 parts by weight of a polymeric binder; from about 40 parts by weight to about 1 part by weight and preferably from about 22 parts by weight to about 10 parts by weight of a toner wetting compound; from about 20 parts by weight to about 1 part by weight and preferably from about 10 parts by weight to about 1 part by weight of an antistatic compound; from about 16 parts by weight to about 1 part by weight and preferably from about 12 parts by weight to about 1 part by weight of a lightfastness component; and from about 1 part by weight to about 10 parts by weight and preferably from about 1 part by weight to about 5 parts by weight of a filler or traction compound and an optional biocide present in various suitable amounts and wherein the total of all components in this layer is about 100 percent.

The amounts of components in the toner receiving coating or layer can be determined, for example, as follows:

Various blends of binder, toner wetting compound, antistatic component, lighflastness component, and filler are generated in acetone or toluene and coated on to various substrates such as polyester MYLAR® using Meyer rods to yield recording sheets with first layers thereover. After drying the xerographic recording sheets at 100° C., they are tested for coating adhesion between the first layer and MYLAR®, printed with a Xerox Corporation 5770™ color copier on the toner receiving layer, for example, to check print quality, gloss values, lightfast values and curl. The data of coating adhesion, print quality, gloss values, lightfast values of the images on the toner receiving layer obtained as a function of the coating composition are analyzed statistically for optimum range of compositions. For example, the toner receiving layer composition comprised of (1) binder; (2) a toner wetting compound; (3) an antistatic compound; (4) lightfast composition; and (5) a filler, has the following preferred composition range based on total of 100 parts: (55+22+10+12+1=100) to (83+10+1+1+5=100).

A preferred composition range for the hydrophobictoner receiving layer of the xerographic recording sheet is the binder present in an amount of from about 55 parts by weight to about 83 parts by weight; the toner wetting compound present in an amount of from about 22 parts by weight to about 10 parts by weight; the antistatic compound present in an amount of from about 10 parts by weight to about 1 part by weight; the lightfast composition present in an amount of from about 12 parts by weight to about 1 part by weight; and the traction controlling filler present in an amount of from about 1 part by weight to about 5 parts by weight.

Examples of hydrophobic binder polymers in contact with the front surface of the substrate include hydrophobic polymers present in an amount of, for example, from about 23 parts by weight to about 87 parts by weight and preferably from about 55 parts by weight to about 83 parts by weight include:

(a) vinyl polymers, such as, (1) vinyl alcohol-vinyl butyral copolymer #381; (2) vinyl alcohol-vinyl acetate copolymers [#379]; (3) vinyl chloride-vinyl acetate copolymers [#063, #068, #070, #422]; (4) vinyl chloride-vinyl acetate-vinyl alcohol terpolymers [#064, #427, #428], Aldrich Chemical Company;

(b) cellulosics, such as, (1) cyanoethylated cellulose, [#091]; (2) cellulose acetate hydrogen phthalate, [#085], Scientific Polymer Products; (3) hydroxypropylmethyl cellulose phthalate, [HPMCP]; (4) hydroxypropyl methyl cellulose succinate, [HPMCS], both Shin-Etsu Chemical; (5) (acrylamidomethyl) cellulose acetate butyrate, [# 43,106-0], Aldrich Chemical Company;

(c) polyesters, such as, (1) polyethylene terephthalate resins such as Rynite available from E.I. DuPont de Nemours and Company; (2) polybutylene terephthalate based ester resins, such as Gafite thermoplastic polyester resins such as #1600-A, #1602-Z, #1602-F, all being available from GAF Corporation, Vitel 1000 series, Vitel 2000 series, Vitel 3000 series, Vitel 4000 series, Vitel 5000 series available from Shell Chemical Company; (3) bisphenol-A fumarate polyester resins, #E-750, #E-750-1, #E-751, #E-752, #E-753, #E-764, #E-5297, all being available from Owens-Corning Fibreglass Corporation; (4) rosin modified maleic polyester resins such as #PA-55-004, #PA-55-011, #PA-55-012, #PA-55-013, #PA-55-023, #PA-55-024, #PA-55-025, #PA-55-030, #PA-55-048, #PA-55-164, #PA-55-360, #PA-55-361, #PA-55-364, all being available from Polymer Applications Incorporated; (5) polyester adipate Merrol P-Series; (6) polyester azelate, Merrol #P-9500 and #P-1030LV; (7) polyester glutarate, Merrol #P-5510; (8) polyester nylonate, Merrol #P-5511; (9) polyester phthalate, Merrol #P-8425, available from Merrand International Corporation; (10) polyester polyol, Terate #202, #203, #204, available from Hercules Incorporated; (11) poly(ethylene adipate) #147, Scientific Polymer Products; (12) poly(ethylene succinate) such as #149, Scientific Polymer Products; (13) poly(ethylene azelate) such as #842, available from Scientific Polymer Products; (14) poly(1,4-butylene adipate) such as #150, available from Scientific Polymer Products; (15) poly(trimethylene adipate) such as #594, available from Scientific Polymer Products; (16) poly(trimethylene glutarate) such as #591, Scientific Polymer Products; (17) poly(trimethylene succinate) such as #592, available from Scientific Polymer Products; (18) poly(hexamethylene succinate) such as #124, Scientific Polymer Products; (19) poly (diallyl phthalate) such as #010, available from Scientific Polymer Products; (20) poly(diallyl isophthalate) such as #011, available from Scientific Polymer Products; (21) thiodipropionate TDP 2000, from Eastman Chemicals Company; (22) polyester-ether resins, available from Hytrel, E.I. DuPont. de Nemours and Company, Lomod, and General Electric Company; (23) polyester-co-polycarbonate such as APE KLI-9306, APE KLI-9310, available from Dow Chemical Company; (24) poly (1,4-benzoate) (PBHA) Ekonole®; (25) copolymers of PBHA with 4,4'-biphenol and terphthalic acid Ekkcel®, Ekkcel-I2000®, Xydar® LC; (26) copolymers of PBHA with 2-oxynaphthalene-6-carbonyl units or 2,6-dioxy naphthalene and terephthaloyl units available as Celanese Vectra LC®;

(d) polystyrene derivatives, such as, (1) poly(α-methylstyrene), [#2055]; (2) styrene-butylmethacrylate copolymers, [#595], Scientific Polymer Products;

(e) acrylic polymers such as poly(methyl methacrylate) [#037A, #037B, #037D, #307, #424, #689], Scientific Polymer Products; and the like.

Examples of suitable toner wetting compounds for the first toner receiving layer present in amounts of, for example, from about 40 parts by weight to about 1 part by weight and preferably from about 22 to about 10 parts by weight include (1) β-propiolactam, Aldrich (Aldrich Chemical throughout) #32,846-4; (2) 2-pyrrolidinone, Aldrich #P7,437-04; (3) δ-valerolactam, Aldrich #V20-9; (4) ε-caprolactam, Aldrich #24,059-1; (5) N-methyl caprolactam, Aldrich #22,476-6; (6) 2-azacyclooctanone, Aldrich #A9,463-8; and (7) N-vinyl caprolactam, Aldrich #41,546-4; imide compounds, such as, (1) 2-azabicyclo [2.2.1] hept-5-en-3-one, Aldrich #33,191-0; (2) N-ethylmaleimide, Aldrich #12,828-7; (3) N-butyl maleimide, Aldrich #38,296-5; (4) N-methylsuccinimide, Aldrich #38,538-4; (5) 2-dodecyl-N-(2,2,6,6-tetra methyl-4-ppiperidinyl) succinimide, Aldrich #41,317-8; (6) 2-dodecyl-N-(1,2,2,6,6-penta methyl-4-piperdinyl) succinimide, Aldrich #41,318-6; (7) N-(1-acetyl-2,2,6,6-tetramethyl-4-piperidinyl)-2-dodecylsuccinimide, Aldrich #41,319-4; (8) α-methyl-α-propyl succinimide, Aldrich #19,495-6; (9) N-ethylphthalimide, Aldrich #40,321-0; (10) N-propylphthalimide, Aldrich #41,761-0; (11) N-(3-bromopropyl) phthalimide, Aldrich #B8,000-3; (12) phthalimido acetaldehyde diethylacetal, Aldrich #P4,020-4; (13) diethyl(phthalimido methyl) phosphonate, Aldrich #36,622-6; (14) N-benzyl formamide, Aldrich #15,284-6; (15) 1-benzyl-3-methyl-2-thiourea; Aldrich #27,550-6;

(a) benzyl amine derivatives, such as, (1) 2-(benzylamino) cyclohexanemethanol, Aldrich #40,508-6; Aldrich #40,509-4; (2) N-benzyl methyl amine, Aldrich #B2,560-6; (3) N-benzyl-α-methylbenzylamine, Aldrich #43,173-7; (4) N-benzylethanolamine, Aldrich #B2,200-3; (5) N-benzyl-N-methylethanol amine, Aldrich #36,641-2;

(6) 2-benzylaniline, Aldrich #23,535-0; (7) N-benzylidene aniline, Aldrich #27,279-5; (8) 3-(N-benzyl-N-methyl amino)-1,2-propanediol, Aldrich #21, 850-2; (9) 2-(benzyl amino)-6-methyl pyridine, Aldrich #34,4730-7; (10) benzyl-L-cysteinol, Aldrich #34,525-3;

(b) benzyl esters, such as, (1) benzyl-2-bromoacetate, Aldrich #24,563-1; (2) benzyl butyrate, Aldrich #11, 239-9; (3) benzyl cinnamate, Aldrich #23,421-4; (4) benzyl (S)-lactate, Aldrich #42,484-6; (5) benzyl-N-hydroxycarbamate, Aldrich #32,327-6; (6) benzyl-N-(2-hydroxyethyl) carbamate, Aldrich #40,790-9;

(c) heterocyclic substituted benzyls, such as, (1) 1-benzyl-4-hydroxypiperidine, Aldrich #15,298-6; (2) 1-benzylimidazole, Aldrich #11,641-6; (3) 1-benzyl-2-methyl imidazole, Aldrich #36,971-3; (4) 1-benzyl-3-pyrrolidinol, Aldrich #30,282-1; (5) 1-benzyl-3-pyrrolidinone, Aldrich #12,375-7; and (d) benzyl ether derivatives, such as, (1) 3-benzyloxy aniline, Aldrich #10,080-3; (2) benzyloxybenzaldehyde, Aldrich #12,371-4, Aldrich #B2,700-5; (3) benzyloxybenzylalcohol, Aldrich #18, 732-1; (4) 2-benzyloxy ethanol, Aldrich #25,286-7; (5) benzyloxy-methoxybenzaldehyde, Aldrich #16,361-9, Aldrich #16,395-3, Aldrich #43,479-5; (6) 4-benzyloxy-3-methoxy benzyl alcohol, Aldrich #18, 905-7; (7) 4'-benzyloxy-2'-methoxy-3'-methyl acetophenone, Aldrich #28,883-2; and (8) 4-benzyloxy-3-methoxystyrene, Aldrich #20,557-5.

Examples of suitable biocides preferably present in the toner receiving layer include those as disclosed for example, in U.S. Pat. No. 5,624,743, the disclosure of which is totally incorporated herein by reference, present in amounts of, for example, from about 5 parts by weight to about 0.1 part by weight and preferably from about 3 parts by weight to about 1 part by weight, and more specifically, biocide examples are:

(a) nonionic biocides, such as, (1) 1,2-dibromo-2, 4-dicyano-butane (Metasol CB-210, CB-235, Calgon Corporation); (2) 2,2-dibromo-3-nitropropionamide (Metasol RB-20, Calgon Corporation); (3) N-α-(1-nitroethyl benzylethylene diamine) (Metasol J-26, Calgon Corporation), (4) 3,5-dimethyl tetrahydro-2H-1, 3,5-thiadiazine-2-thione (Slime-Trol RX-28, Betz Paper Chem Inc.);

(b) anionic biocides, such as, (1) anionic potassium N-hydroxymethyl-N-methyl-dithiocarbamate (Busan 40 from Buckman Larboratories Inc.); (2) an anionic blend of N-hydroxymethyl-N-methyl dithiocarbamate, 80 parts by weight, and sodium 2-mercapto benzothiazole, 20 parts by weight, (Busan 52 from Buckman Laboratories Inc.); (3) an anionic blend of sodium dimethyl dithiocarbamate, 50 parts by weight and disodium ethylenebis-dithiocarbamate, 50 parts by weight, (Metasol 300 from Calgon Corporation; (4) an anionic blend of N-methyldithiocarbamate, 60 parts by weight, and disodium cyanodithioimidocarbonate, 40 parts by weight, (Busan 881 from Buckman Laboratories Inc.); and (c) cationic biocides, such as, (1) cationic poly (oxyethylene (dimethylamino)-ethylene (dimethylamino) ethylene dichloride) (Busan 77, Buckman Laboratories Inc.); (2) a cationic blend of methylene bisthiocyanate and dodecyl guanidine hydrochloride (Slime-Trol RX-31, RX-32, RX-32P, RX-33, from Betz Paper Chem Inc.); (3) a cationic blend of methylene bisthiocyanate and chlorinated phenols (Slime-Trol RX-40 from Betz Paper Chem Inc.).

The first hydrophobic toner receiving layer preferably contains lightfastness compounds present in amounts of, for example, from about 0.5 parts by weight to about 35 parts by weight and preferably from about 2 parts by weight to about 30 parts by weight. Examples of lightfastness compounds are disclosed in U.S. Pat. No. 5,624,743, the disclosure of which is totally incorporated herein by reference, and U.S. Ser. No. (not yet assigned—D/98266), the disclosure of which is totally incorporated herein by reference, such as, (1) UV absorbing compounds; (2) antioxidant compounds; (3) antiozonant compounds, and (4) mixtures thereof.

Examples of lightfastness, such as lightfastness UV absorbing compounds are (1) octadecyl-3,5-di-tert-butyl-4-hydroxy hydrocinnamate, Irganox-1076, from Ciba-Geigy Corporation; (2) 2-(2'-hydroxy-5'-methyl phenyl) benzotriazole, Tinuvin 900, from Ciba Geigy Corporation; (3) 2-(4-benzoyl-3-hydroxyphenoxy) ethylacrylate (Cyasorb UV-416, #41,321-6, Aldrich Chemical Company); (4) [2,2,6,6-tetramethyl-4-piperidinyl/β,β,β',β'-tetramethyl-3, 9-(2,4,8,10-tetraoxospiro-(5,5)-undecane) diethyl]-1,2,3, 4-butanetetracarboxylate, Mixxim HALS 68, from Fairmount Corporation; (5) poly[2-(4-benzoyl-3-hydroxyphenoxy) ethylacrylate] (Cyasorb UV-2126, #41, 323-2, Aldrich Chemical Company); (6) poly[N,N-bis (2,2, 6,6-tetramethyl-4-piperidinyl)-1,6-hexanediamine-co-2,4-dichloro-6-morpholino-1,3,5-triazine), Cyasorb UV-3346, #41,324-0, Aldrich Chemical Company and the like.

Lightfastness antioxidant compound examples are (1) didodecyl-3,3'-thio dipropionate, Cyanox, LTDP #D12,840-6; (2) tris(4-tert-butyl-3-hydroxy-2,6-dimethyl benzyl) isocyanurate, Cyanox 1790, #41,322-4, #D12,840-6; (3) 1,3,5-trimethyl-2,4,6-tris(3,5-di-tert-butyl-4-hydroxybenzyl) benzene, Ethanox 300, #41,328-3, all available from Aldrich Chemical Company; (4) N,N'-β,β'-naphthalene-4-phenylene diamine, Anchor DNPD, from Anchor Corporation; (5) 4,4'-methylene-bis(dibutyl dithiocarbamate), Vanlube 7723, available from Vanderbilt Corporation; (6) 2,2,4-trimethyl-1,2-hydroquinoline, Vulkanox HS, available from Mobay Corporation; and examples of lightfast antiozonant compounds are (1) N,N'-bis(1,4-dimethyl pentyl)4-phenylene diamine, Santoflex 77, from Monsanto Chemicals; (2) 2,4,6-tris-(N-1, 4-dimethylpentyl-4-phenylene diamino)-1,3,5-triazine, Durazone 37, available from Uniroyal Corporation; (3) 6-ethoxy-1,2-dihydro-2,2,4-trimethyl quinoline, Santoflex AW, from Monsanto Chemicals; (4) bis-(1,2,3,6-tetrahydrobenzaldehyde) pentaerythritol acetal, Vulkazon AFS/LG, available from Mobay Corporation.

In addition, the first coating preferably contains antistatic compounds, which can be present in any effective amount, and typically are present in amounts of from about 0.5 parts by weight to about 30 parts by weight and preferably from about 2 parts by weight to about 25 parts by weight.

Suitable antistatic compounds include both anionic and cationic components, or materials, such as monoester sulfosuccinates, diester sulfosuccinates and sulfosuccinamates. Examples of cationic antistatic components are diamino alkanes; quaternary salts; quaternary acrylic copolymer latexes such as HX-42-1, HX-42-3, Interpolymer Corporation; ammonium quaternary salts as disclosed in U.S. Pat. No. 5,320,902; phosphonium quaternary salts as disclosed in U.S. Pat. No. 5,760,809, the disclosure of which is totally incorporated herein by reference; and sulfonium, thiazolium and benzothiazolium quaternary salts as disclosed in U.S. Pat. No. 5,314,747, the disclosure of which is totally incorporated herein by reference. Specific antistatic compound examples are (1) ethyl triphenyl phosphonium bromide, (Aldrich #E5,060-4); (2) heptyltriphenyl phosphonium bromide, (Aldrich #37,753-8); (3) dodecyl triphenylphosphonium bromide, (Aldrich #11,262-6); (4) [3-(ethoxycarbonyl)-2-oxypropyl] triphenyl phosphonium chloride, (Aldrich #42,424-2); (5) (4-ethoxybenzyl) triphenyl phosphonium bromide, (Aldrich #26,648-5); (6) benzyl triphenylphosphonium bromide, (Aldrich # 43,005-6); (7) (ethoxy carbonyl methyl) dimethyl sulfonium bromide, (Aldrich #14,526-2); (8) tetraoctyl phosphonium bromide, (Aldrich #44,213-5); (9) tetraethyl ammonium hexafluorophosphate, (Aldrich #43,411-6); (10) tetrabutyl ammonium dihydrogen phosphate, (Aldrich #26,809-7); (11) 1-propyl pyridinium bromide; (12) 2-propyl isoquinolinium bromide; (13) 1-phenacyl pyridinium bromide; (14) 1,3-didecyl-2-methyl imidazolinium chloride; (15) bis (tetramethylammonium) carbonate, (16) bis (tetrabutylammonium) sulfate; (17) (2-acryloyloxyethyl) (benzoylbenzyl) dimethyl ammonium bromide; (18) (2-acryloyloxy ethyl) trimethyl ammonium methyl sulfate; and (19) o-xylylene bis(triphenyl) phosphonium bromide).

The first coating, that is the transparent hydrophobic toner receiving layer, on the front side of the substrate can include a traction controlling filler compound, present in amounts of, for example, from about 0.5 part by weight to about 4 parts by weight and preferably from about 1 part by weight to about 4 parts by weight. Examples of pigment or filler compounds include zirconium oxide (SF-EXTRA Z-Tech Corporation), colloidal silica, such as Syloid 74, Grace Company, cellulosic compounds preferably insoluble in water or organic solvents, like trichlorofluoroethylene and which cellulosic compounds are available from Scientific Polymer Products).

The second preferably pigmented opaque luminescent coating is comprised of a polymeric binder, a luminescence imparting compound, an antistatic compound, a lightfastness compound, a filler and an optional biocide. The thickness of this second coating is, for example, from about 0.1 to about 25 microns and preferably from about 5 to about 20 microns.

In embodiments, the second coating is comprised of from about 68 parts by weight to about 5 parts by weight and preferably from about 65 parts by weight to about 10 parts by weight of a polymeric binder; from about 30 parts by weight to about 1 parts by weight and preferably from about 30 parts by weight to about 5 parts by weight of a luminescence imparting compound; from about 0.5 parts by weight to about 10 parts by weight and preferably from about 2 parts by weight to about 10 parts by weight of an antistatic compound; from about 0.5 parts by weight to about 10 parts by weight and preferably from about 2 parts by weight to about 10 parts by weight of a lightfastness compound; and from about 0.5 parts by weight to about 74 parts by weight and preferably from about 1 parts by weight to about 65 parts by weight of a filler and wherein the total of all components thereof in this layer are about 100 percent or 100 parts.

Examples of polymeric binders, preferably for the second coating are water, or substantially water dispersible polymers such as:

(a) latex polymers, such as, (1) rubber latex such as neoprene Serva Biochemicals; (2) polyester latex such as Eastman AQ 29D Eastman Chemical Company; (3) ethylene-vinyl acetate copolymer emulsions, Air Products and Chemicals Inc.; (4) acrylic-vinyl acetate copolymer emulsions, such as Rhoplex AR-74 from Rohm and Haas Co; (5) vinyl acrylic terpolymer latex, such as 76 RES 3103 from Union Oil Chemical Division; (6) acrylic emulsion latex, such as Rhoplex B-15J, Rhoplex P-376, Rhoplex TR-407, Rhoplex E-940, Rhoplex TR-934, Rhoplex TR-520, Rhoplex HA-24, and Rhoplex NW-1825 from Rohm and Haas Company; (7) polystyrene latex, such as DL6622A, DL6688A, and DL6687A from Dow Chemical Company; (8) styrene-butadiene latexes, such as DL6672A, DL6663A, DL6638A, DL6626A, DL6620A, DL615A, DL617A, DL620A, DL640A, DL650A from Dow Chemical Company; (9) butadiene-acrylonitrile-styrene terpolymer latex, such as Tylac synthetic rubber latex 68-513 from Reichhold Chemicals Inc., and the like; and (b) solvent soluble, or substantially solvent soluble polymers of (1) poly(2-methoxy ethylacrylate) #891; (2) poly (cyclohexylacrylate), #690; (3) poly(lauryl methacrylate), #168; (4) polyethylene #041; (5) polypropylene #130, #780; (6) poly(isobutylene) #040A, #683, #684; (7) poly(propylene-co-ethylene) copolymer, #454, #455, Scientific Polymer Products; (8) poly(ethylene-co-1-butene) copolymer, #43,469-8, #43,472-8; (9) poly(ethylene-co-1-butene-co-1-hexene) copolymer #43,474-4, #43,475-2; (10) poly (ethylene-co-methylacrylate) copolymer #43,263-6, #43,264-4, #43,265-2; (11) poly(ethylene-co-methylacrylate-co-glycidyl meth acrylate)copolymer #43,364-0; (12) poly(ethylene-co-ethylacrylate-co-maleic anhydride) copolymer #43,083-8, #43,084-6; (13) poly(ethylene-co-butylacrylate-co-carbon monoxide) copolymer #43,064-1, #43,066-8; (14) poly (ethylene-co-glycidylyl methacrylate) copolymer #43,086-2; (15) poly(ethylene-co-vinylacetate-co-methacrylic acid) copolymer #42,654-7, #42,655-5; (16) poly(ethylene-co-vinyl acetate-co-carbon monoxide) copolymer #43,062-5; (17) poly(ethylene-co-vinylacetate)-graft-poly(maleic anhydride) copolymer #42,652-0, #42,653-9, Aldrich Chemical Company; (18) poly(ethylene-co-propylene-co-diene) terpolymer #350, #360, #448, #449, Scientific Polymer Products; (19) polystyrene-block-poly(ethylene-random-butylene)-block-polystyrene #43,245-8, Aldrich Chemical Company; and (20) polyvinylmethylether #450, Scientific Polymer Products.

The second coating on the back side of the transparent substrate preferably contains image enhancing compounds that enable color changes with heat such as liquid crystalline materials, and more specifically, luminescent compositions capable of generating fluorescence, phosphorescence or chemiluminescence phenomenon. These image enhancing materials or mixtures thereof are present in amounts of, for example, from about 30 parts by weight to about 1 part by weight and preferably from about 30 parts by weight to about 5 parts by weight.

The luminescent components are selected from the group consisting of inorganic powder phosphors derived from calcium halophosphate, barium magnesium aluminate, magnesium aluminate, strontium chloropatite, zinc silicate and the oxides, oxysulfides, phosphates, vanadates and silicates of yttrium, gadolinium or lanthanum. Commonly used activators that can be selected are rare-earth ions such as europium II and III, terbium III, cerium III, and tin II. Fluorescent chemical compounds that convert UV radiation to visible radiation at the blue end of the spectrum, and known as fluorescent whitening compounds or optical brighteners can be selected, and are derived for example, from stilbene, coumarin and naphthalimide. Other fluorescent brighteners are derived from fluorescent dyes as well as polymeric dyes such as polymeric phthalocyanines, and the like. Commercially available pigment colors are dispersed in polymers such as polyamide or triazine-aldehyde-amide, reference the Day-Glo Color Corporation colors, such as Day-Glo-A-Series including A-17-N saturn yellow; A-18-N signal yellow; A-16-N arc yellow; A-15-N blaze orange; A-14-N fire orange; A-13-N rocket red; A-12 neon red; A-11 aurora pink; A-21 corona magenta; A-19 horizon blue; also included are materials from the Day-Glo-D-Series; Day-Gloopaque-T-Series; Day-Glo-AX-Series; Day-Glo-SB-Series; Day-Glo-HM-Series; Day-Glo-HMS-Series; those dispersed in polyester or Triazine-aldehyde-amide are Radiant Color Corp. including Radiant R-105-Series; including R-105-810 chartreuse; R-105-811 green; R-105-812 orange-yellow; R-105-813 orange; R-105-814 orange-red; R-105-815 red; R-105-816 cerise; R-105-817 pink; R-103-G-118 magenta; R-103-G-119 blue; also included are materials from the R-203-G-series; R-P-1600-series; R-P-1700-series; R-XRB-series; R-K-500 series; and visiprint series; those dispersed in triazine-aldehyde-amide are Lawter Chemicals including Lawter-B-Series including B-3539 lemon yellow; B-3545 green; B-3515 gold yellow; B-3514 yellow orange; B-3513 red orange; B-3534 red; B-3530 cerise red; B-3522 pink; B-3554 magenta; B-3556 vivid blue; also included are materials from the Lawter-G-3000-Series; Lawter-HVT-Series and the like. Inorganic powder phosphors, polymer dispersed organic pigment phosphors monomeric or polymeric dye based phosphors can be applied to various substrates via solvent coatings where the phosphor is compounded with a polymer and dispersed or dissolved in a solvent such as ethanol, esters, ketones, glycol ethers and water. The use of solvents such as ethanol and water is preferred primarily because they are less toxic.

Examples of liquid crystalline ester materials of the second colorant layer are selected from the group consisting of (1) (−) 2-methyl butyl-4-(4'-methoxy benzylidene-amino) cinnamate a noncholesteryl chiral compound {CAS #24140-30-5}; (2) (S)-(+)-2-methylbutyl-4-(4-decyloxy benzylidene-amino) cinnamate (Aldrich #32,476-6); (3) ethyl 4-ethoxybenzyl-4'-amino cinnamate {CAS # 28 63-94-7}; (4) 4-[(S)-(−)-2-ethoxy propoxy] phenyl 4-(decyloxy) benzoate, (Aldrich #32,792-1); (5) 4-[(R)-(−) 2-chloro-3-methyl butyryloxy]phenyl-4-(decyloxy) benzoate, (Aldrich #32,854-5); (6) 4-[(S)-(+)2-chloro-3-methyl butyryloxy] phenyl 4-(decyloxy)benzoate, (Aldrich #32,855-3); (7) 4-[(S)-(+)-(4-methyl hexyloxy] phenyl 4-(decyloxy) benzoate, (Aldrich #32,792-1); (8) (R)-4[(1-methylheptyloxy)carbonyl]phenyl 4'-octyloxy-4-biphenylcarboxylate, (Aldrich #40,886-7); (9) (S)-4-[(1-methylheptyloxy) carbonyl] phenyl 4'-octyloxy-4-biphenyl carboxylate, (Aldrich #40,885-9); (10) cholesteryl oleate, (Aldrich #37,293-5); and (11) cholesteryl oleyl carbonate (Aldrich #15,115-7).

Further, the second coating on the back side of the transparent substrate preferably contains lightfastness compounds present in amounts of from about 0.5 parts by weight to about 10 parts by weight and preferably from about 2 parts by weight to about 10 parts by weight including UV absorbing compounds, antioxidants and antiozonants the same as or similar to those selected for the first coating including, glycerol-4-amino benzoate, Escalol 106, Van Dyk Corporation; resorcinol monobenzoate, RBM, Eastman Chemicals; octyl dimethyl amino benzoate, Escalol 507, Van Dyk Corporation; didodecyl-3,3'-thiodipropionate, Cyanox, LTDP, #D12,840-6, Aldrich Chemical Company; ditridecyl-3,3'-thiodipropionate, Cyanox 711, #41,311-9, Aldrich Chemical Company; N-isopropyl-N'-phenyl-phenylene-diamine, available as Santoflex IP, Monsanto Chemicals; N-(1,3-dimethylbutyl)-N'-phenyl-phenylene-diamine, Santoflex 13, Monsanto Chemicals; N,N'-di(2-octyl)-4-phenylene diamine, Antozite-1, Vanderbilt Corporation; and the like.

The second colorant coating composition on the backside of the transparent substrate can also contains antistatic compounds and colorants. These antistatic compounds are as illustrated herein, and examples of colorants are titanium dioxide (Rutile or Anatase from NL Chem Canada, Inc.); hydrated alumina (Hydrad TMC-HBF, Hydrad TM-HBC, J. M. Huber Corporation); barium sulfate (K. C. Blanc Fix HD80, Kali Chemie Corporation); calcium carbonate (Microwhite Sylacauga Calcium Products); calcium silicate (J. M. Huber Corporation); blend of calcium fluoride and silica, such as Opalex-C Kemira O.Y.; zinc oxide, such as Zoco Fax 183, Zo Chem; blends of zinc sulfide with barium sulfate, such as Lithopane, Schteben Company, and the like, and mixtures thereof. Colornats, such as known pigments which enhance color mixing and assist in improving print-through can also be selected for the invention recording sheets. Moreover, know biocides, such as those illustrated herein can be selected for the second coating. Other know suitable components may be selected for both the first and second layers.

The coating compositions can be applied to the substrate by any suitable technique. For example, the coatings can be applied by a number of known techniques, including melt extrusion, reverse roll coating, solvent extrusion, and dip coating processes. In dip coating, a web of material to be coated is transported below the surface of the coating material (which generally is dissolved in a solvent) by a single roll in such a manner that the exposed site is saturated, followed by the removal of any excess coating by a blade, bar, or squeeze roll. The process is then repeated with the appropriate coating materials for application of the other layered coatings. With reverse roll coating, the premetered coating material (which generally is dissolved in a solvent) is transferred from a steel applicator roll onto the web material to be coated. The metering roll is stationary or is rotating slowly in the direction opposite to that of the applicator roll. In slot extrusion coating, a flat die is used to apply coating material (which generally is dissolved in a solvent) with the die lips in close proximity to the web of material to be coated. The die can have one or more slots if multi layers are to be applied simultaneously. In the multilayer slot coating, the coating solutions form a liquid stack in the gap where the liquids come in the contact with the moving web to form a coating. The stability of the interface between the two layers depends on wet thickness, density and viscosity ratios of both layers which need to be kept as close to one as possible. Once the desired amount of coating has been applied to the web, the coating is dried, typically at from about 25° C. to about 100° C. in an air drier.

Imaged substrates of the present invention preferably exhibit in embodiments thereof reduced curl upon being printed with solid and liquid inks. Generally, the term "curl" refers to the distance between the base line of the arc formed by the imaged substrate when viewed in cross-section across its width (or shorter dimension, for example 8.5 inches in an 8.5 by 11 inch sheet, as opposed to length, or longer dimension, for example 11 inches in an 8.5 by 11 inch sheet) and the midpoint of the arc. To measure curl, a sheet can be held with the thumb and forefinger in the middle of one of the long edges of the sheet (for example, in the middle of one of the 11 inch edges in an 8.5 by 11 inch sheet) and the arc formed by the sheet can be matched against a pre-drawn standard template curve.

Gloss values recited herein were obtained on a 75° Glossmeter, Glossgard II from Pacific Scientific (Gardner/Neotec Instrument Division); and optical density measurements recited herein were obtained on a Pacific Spectrograph Color System. The system consists of two major components, an optical sensor and a data terminal. The optical sensor employs a 6 inch integrating sphere to provide diffuse illumination and 2 degrees viewing. This sensor can be used to measure both transmission and reflectance samples. When reflectance samples are measured, a specular component may be included. A high resolution, full dispersion, grating monochromator was used to scan the spectrum from 380 to 720 nanometers (nm). The data terminal features a 12 inch CRT display, numerical keyboard for selection of operating parameters, and the entry of tristimulus values, and an alphanumeric keyboard for entry of product standard information. The print through value as characterized by the printing industry is Log base 10 (reflectance of a single sheet of unprinted paper against a black background/reflectance of the back side of a black printed area against a black background) measured at a wavelength of 560 nanometers. Transparent refers for example, to a recording sheet with a Haze value of from about 0 to about 5 and preferably about 0 and which value is measured with a Haze meter; hydrophobic refers for example, to a component that lacks or substantially lacks an affinity for water; opaque refers for example, to a component that neither reflects or emits light to any substantial amount or no amount and which component possesses a Haze value of for example, from about 10 to about 100, and preferably from about 50 to about 90; and the colornat luminscent layer or coating preferably contains a polymeric binder, a luminscent compound, an natistatic compound, a lightfastness compound, and a filler.

The polyester dry toner selected for the Examples that follow is comprised of 92 parts of a polymer generated from the condensation product of cyclohexane diol, ethoxylated/propoxylated bisphenol-A with terephthalic acid and dodecyl succinnic acid; 8 parts by weight of the colorant carbon black, REGAL 330®, and as surface additives 0.5 part by weight of titanium dioxide and 0.5 part by weight of silica, AEROSIL 972®.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Twenty coated xerographic recording sheets were prepared by the solvent extrusion process (single side each time initially) on a Faustel Coater using a one slot die, by providing for each MYLAR® sheet (roll form) in a thickness of 75 microns a coating generated from a hydrophobic blend comprised of 49 parts by weight of hydroxypropylmethyl cellulose phthalate; 20 parts by weight of the toner wetting compound 2-azabicyclo [2.2.1] hept-5-en-3-one, (Aldrich #33,191-0); 5 parts by weight of the antistatic compound polymethyl acrylate trimethyl ammonium chloride latex; 3 parts by weight of the UV absorbing compound 2-(4-benzoyl-3-hydroxyphenoxy)ethylacrylate (Cyasorb UV-416, #41,321-6); 1 part by weight of the antioxidant compound didodecyl-3,3'-thiodipropionate (Cyanox, LTDP, #D12,840-6); 1 part by weight of the antiozonant N,N'-bis (1,4-dimethyl pentyl)-4-phenylene diamine, Santoflex 77, obtained from Monsanto Chemicals, and 1 parts by weight of the colloidal silica, Syloid 74, and which blend was present in a concentration of 5 percent by weight in acetone. Subsequent to air drying at 100° C. the dried MYLAR® rolls, contained 0.5 gram, 5 microns in thickness, of the above components in the amounts indicated.

Rewinding the coated side onto an empty core, the uncoated MYLAR® backside was coated with a coating composition comprising 25 parts by weight of the acrylic emulsion latex, Rhoplex B-15J obtained from Rohm & Haas, and which emulsion contains 33 weight percent of an acrylate binder, 64 weight percent of water, and 3 weight percent of an alcohol, preferably isopropanol; 20 parts by weight of the luminescence imparting compound Radiant R-105-812 orange-yellow obtained from Radiant Color Corporation; 9.0 parts by weight of the antistatic compound decamethylene bis trimethyl ammonium bromide, (Aldrich #28,547-1); 1.0 part by weight of the biocide poly (oxyethylene (dimethylamino)-ethylene (dimethylamino) ethylene dichloride) (Busan 77, Buckman Laboratories Inc.); 3.0 parts by weight of the UV absorbing compound poly[N,N-bis(2,2,6,6-tetramethyl-4-piperidinyl)-1,6-hexane diamineco-2,4-dichloro-6-morpholino-1,3,5-triazine) (Cyasorb UV-3346, #41,324-0, Aldrich Chemical Company); 2 parts by weight of the antioxidant compound N,N'-β,β'-naphthalene-ρ-phenylenediamine, Anchor DNPD, from Anchor Corporation, and 40 parts by weight of the filler/pigment calcium carbonate Microwhite (obtained from Sylacauga Calcium Products). The resulting mixture was present in a concentration of 25 percent by weight in water. Subsequent to drying at 100° C., the sheets were coated with 0.7 gram of the above prepared pigmented coating, to a thickness of 8 microns. The two side coated translucent xerographic recording sheets were then cut into 8.5 by 11 inch sheets.

Twenty of the above prepared sheets were fed into a Xerox Corporation Docutech 40 color apparatus containing the poyester toner indicated hereinbefore and right reading images were obtained having optical density values of 1.20 (cyan), 1.15 (magenta), 0.87 (yellow) and 1.35 (black), wherein the toner used for development was a dry toner as indicated herein.

The developed images resulting on the translucent or semitransparent xerographic recording sheets had low curl of 15 millimeters, and a 75° gloss value of 95. These images were waterfast, about 98 percent, when washed with water for 2 minutes at 50° C. and lightfast, about 99 percent, for a period of six months without any change in their optical density.

EXAMPLE II

Twenty coated translucent xerographic recording sheets were prepared by the solvent extrusion process (single side each time initially) on a Faustel Coater using a one slot die, by providing for each MYLAR® sheet (roll form) in a thickness of 75 microns with a coating generated from a hydrophobic blend comprised of 69 parts by weight of aromatic ester carbonate copolymer, APE KLI-9306, Dow Chemical Company; 20 parts by weight of the toner wetting compound benzyloxy-methoxy benzaldehyde, (Aldrich #16,361-9); 5 parts by weight of the antistatic compound (4-ethoxybenzyl) triphenyl phosphonium bromide (Aldrich #26,648-5); 3 parts by weight of the UV absorbing compound poly[N,N-bis(2,2,6,6-tetramethyl-4-piperidinyl)-1,6-hexanediamine-co-2,4-dichloro-6-morpholino-1,3,5-triazine) (Cyasorb UV-3346, #41,324-0, Aldrich Chemical Company); 1 part by weight of the antioxidant compound 2,2,4-trimethyl-1,2-hydroquinoline; 1 part by weight of the antiozonant compound 6-ethoxy-1,2-dihydro-2,2,4-trimethyl quinoline, both being available from Mobay Corporation, and 1 part by weight of the filler Opalex-C (which is a blend of calcium fluoride and silica), Kemira O.Y., and which blend was present in a concentration of 5 percent by weight in acetone. Subsequent to air drying at 100° C. and monitoring the difference in weight prior to and subsequent to coating, the dried MYLAR® rolls contained 0.5 gram, 5.

Rewinding the above prepared coated side onto an empty core, the uncoated backside was coated with a pigmented coating composition comprising 30 parts by weight poly (ethylene-co -methylacrylate) copolymer obtained from Aldrich #43,263-6; 10 parts by weight of the ester liquid crystalline material (S)-(+)-2-methylbutyl-4-(4-decyloxy benzylidene-amino) cinnamate (Aldrich #32,476-6); 10 parts by weight of the luminescence imparting compound Lawter-B-3539 lemon yellow obtained from Lawter Chemicals; 3.0 parts by weight of the antistatic compound ethyl] triphenyl phosphonium bromide (Aldrich #21,959-2); 2.0 parts by weight of the biocide potassium N-hydroxymethyl-N-methyl-dithiocarbamate (BUSAN 40 from Buckman Larboratories Inc.); 3.0 parts by weight of the UV absorbing compound 2-[2'-hydroxy-3,5-di-(1,1-dimethyl benzyl) phenyl]-2H-benzotriazole, available as Topanex 100BT, from ICI America Corporation; 2 parts by weight of the antioxidant compound N,N'-β,β'-naphthalene-ρ-phenylenediamine, Anchor DNPD, from Anchor Corporation, and 40 parts by weight of the filler or pigment calcium carbonate Microwhite (obtained from Sylacauga Calcium Products); the above mixture was present in a concentration of 25 percent by weight in dichloromethane. Subsequent to drying at 100° C. and monitoring the weight prior to and subsequent to coating, the sheets were coated with 800 milligrams of the above coating, in a thickness of 10 microns. The two side coated xerographic recording sheets were then cut into 8.5 by 11 inch sheets.

These resulting generated cut sheets were utilized in a Xerox 5760 MajestiK Digital Color Copier containing the polyester toner indicated hereinbefore, and images were obtained on the toner receiving side of the recording sheet with the toner indicated herein, such as a SPAR polyester resin based toners, 92 weight percent polyester and 8 weight percent of carbon black, reference Example I. These images had optical density values of 1.45 (cyan), 1.28 (magenta), 0.89 (yellow) and 1.50 (black) and a 75° gloss value of 90. These images were waterfast 97% when washed with water for 2 minutes at 50° C. and lightfast 98% for a period of three months without any change in their optical density. The curl values for these recording sheets were less than about 20 millimeters, for example 17 millimeters.

EXAMPLE III

Twenty xerographic recording sheets were prepared by the solvent extrusion process (single side each time initially) on a Faustel Coater using a one slot die, by providing for each MYLAR® sheet (roll form) in a thickness of 75 microns a hydrophobic blend comprised of 69 parts by weight of poly(α-methylstyrene); 20 parts by weight of the toner wetting compound benzyl butyrate, (Aldrich #11,239-9); 5 parts by weight of the antistat 2-methyl-3-propyl benzothiazolium iodide (Aldrich #36,329-4); 3 parts by weight of the UV absorbing compound poly[2-(4-benzoyl-3-hydroxyphenoxy) ethylacrylate] (Cyasorb UV-2126, #41,323-2, Aldrich Chemical Company); 1 part by weight of the antioxidant compound octadecyl-3,5-di-tert-butyl-4-hydroxy hydrocinnamate, Irganox 1076, from Ciba-Geigy Corporation; 1 part by weight of the antiozonant bis-(1,2,3,6-tetrahydrobenzaldehyde) pentaerythritol acetal, Vulkazon AFS/LG, Mobay Corporation, and 1 part by weight of zinc oxide filler, Zoco Fax 183, Zo Chem, and which blend was present in a concentration of 5 parts by weight in acetone. Subsequent to air drying at 100° C. and monitoring the difference in weight prior to and subsequent to coating, the dried MYLAR® rolls contained 0.5 gram, 5 microns in thickness, of the above toner receiving layer.

Rewinding the coated side onto an empty core, the uncoated backside was coated with a pigmented coating composition comprising 30 parts by weight of a polyester latex, containing a polyester resin, water, and an alcohol it is believed, and obtained as Eastman AQ 29D from Eastman Chemical Company; 20 parts by weight of the antistatic compound ethyl triphenyl phosphonium bromide (Aldrich #21,959-2); 2.0 parts by weight of the biocide potassium N-hydroxymethyl-N-methyl-dithiocarbamate (BUSAN 40 from Buckman Larboratories Inc.); 3.0 parts by weight of the UV absorbing compound 2-(2'-hydroxy-5'-methylphenyl) benzotriazole, Tinuvin 900, from Ciba Geigy Corporation, 2 parts by weight of the antioxidant compound N,N'-β,β'-naphthalene-ρ-phenylenediamine, Anchor DNPD, from Anchor Corporation, and 60 parts by weight of the pigment, or filler calcium carbonate Microwhite (obtained from Sylacauga Calcium Products). The mixture was present in a concentration of 25 parts by weight in water. Subsequent to drying at 100° C. and monitoring the weight prior to and subsequent to coating, the sheets were coated with 800 milligrams of the coating, in a thickness of 10 microns. The two side coated translucent xerographic recording sheets were then cut into 8.5 by 11 inch sheets.

The above coated sheets were utilized in a Xerox 5760 MajestiK Digital Color Copier and images were obtained on the toner receiving side of the recording sheet polyester with the polyester toner indicated herein. These images had optical density values of 1.40 (cyan), 1.23 (magenta), 0.88 (yellow) and 1.50 (black) and a 75° gloss value of 85. These images were waterfast 96% when washed with water for 2 minutes at 50° C. and lightfast 99% for a period of three months without any change in their optical density. The curl values for these recording sheets were about 18 millimeters.

Other embodiments and modifications of the present invention may occur to those skilled in the art subsequent to a review of the information presented herein, these embodiments and modifications, as well as equivalents thereof, are also included within the scope of this invention.

What is claimed is:

1. A recording component comprising a substrate situated between a hydrophobic toner receiving layer and an opaque colorant luminescent layer.

2. A recording component according to claim 1 wherein the substrate is transparent and is selected from the group consisting of (1) polyethylene terephthalate; (2) polyethylene naphthalates; (3) polysulfones; (4) cellulose triacetate; (5) polyvinylchloride; (6) polypropylene.

3. A recording component according to claim 1 wherein the toner receiving layer is comprised of a hydrophobic polymeric binder, an antistatic compound, a toner welting compound, a lightfastness compound, a lightfastness antioxidant, a lightfastness ozonant, optional biocide, and a filler.

4. A recording component according to claim 3 wherein the transparent toner receiving layer is comprised of from about 55 parts by weight to about 83 parts by weight of a hydrophobic binder; the toner wetting compound is present in an amount of from about 22 parts by weight to about 10 parts by weight; the antistatic compound is present in an amount of from about 10 parts by weight to about 1 part by weight; the lightfastness compound is present in an amount of from about 6 parts by weight to about 0.5 part by weight; the lightfastness antioxidant is present in an amount of from about 3 parts by weight to about 0.25 part by weight; the lightfastness antiozonant is present in an amount of from about 3 parts by weight to about 0.25 part by weight; the filler is present in an amount of from about 1 part by weight to about 5 parts by weight, and the total of said components is about 100 percent.

5. A recording component according to claim 3 wherein the polymeric binder is selected from the group consisting of (1) polyethylene terephthalate resins; (2) polybutylene terephthalate ester resins; (3) rosin modified maleic polyester resins; (4) polyester-ether resins; and (5) polyester-co-polycarbonate.

6. A recording component according to claim 3 wherein the toner wetting compound optionally present in amounts of from about 22 parts by weight to about 10 parts by weight is comprised of lactam compounds of (1) β-propiolactam; (2) (±)-2-azabicyclo [2.2.1] hept-5-en-3-one; (3) γ-valerolactam; (4) N-methyl caprolactam; or (5) N-vinylcaprolactam.

7. A recording component according to claim 3 wherein the toner wetting compound is (1) N-ethylmaleimide; (2) 2-dodecyl-N-(2,2,6,6-tetramethyl-4-piperidinyl) succinimide; (3) α-methyl-α-propylsuccinimide; (4) diethyl (phthalimido methyl) phosphonate; or (5) 1-benzyl-3-methyl-2-thiourea.

8. A recording component according to claim 3 wherein the toner wetting compound is (1) 2-(benzylamino) cyclohexane methanol; (2) N-benzylmethylamine; (3) N-benzyl-α-methyl benzyl amine; (4) N-benzylethanolamine; (5) 3-(N-benzyl-N-methylamino)-1,2-propanediol; or (6) benzyl-L-cysteinol.

9. A recording component according to claim 3 wherein the toner wetting compound is (1) benzyl-2-bromo acetate; (2) benzylbutyrate; (3) benzylcinnamate; (4) benzyl(S)-lactate; (5) benzyl-N-hydroxycarbamate; or (6) benzyl-N-(2-hydroxyethyl) carbamate.

10. A recording component according to claim 3 wherein the toner wetting compound is (1) 1-benzyl-4-hydroxypiperidine; (2) 1-benzylimidazole; (3) 1-benzyl-2-methyl imidazole; (4) 1-benzyl-3-pyrrolidinol; or (5) 1-benzyl-3-pyrrolidinone.

11. A recording component according to claim 3 wherein the toner wetting compound is (1) benzyloxy benzaldehyde; (2) benzyloxy benzylalcohol; (3) benzyloxy-methoxy benzaldehyde; (4) 4-benzyloxy-3-methoxy benzylalcohol; or (5)4'-benzyloxy-2'-methoxy-3'-methylacetophenone.

12. A recording component according to claim 3 wherein the antistatic compound optionally present in an amount of from about 10 parts by weight to about 1 part by weight is selected form the group consisting of (1) (4-ethoxybenzyl) triphenyl phosphonium bromide; (2) ethyl triphenyl phosphonium bromide; (3) (ethoxycarbonylmethyl) dimethyl sulfonium bromide; (4) 1-propylpyridiniumbromide; and (5) 2-propylisoquinolinium bromide.

13. A recording component according to claim 1 wherein the thickness of the toner receiving layer is from about 0.1 to about 25 microns.

14. A recording component according to claim 1 wherein the opaque colorant layer is comprised of a polymeric binder, an antistatic compound, a colorant, a luminescence imparting compound, an optional lightfastness compound, and an optional biocide.

15. A recording component according to claim 1 wherein the colorant layer is comprised of from about 68 parts by weight to about 5 parts by weight of a polymeric binder; from about 30 parts by weight to about 1 part by weight of a luminescence imparting compound; from about 0.5 parts by weight to about 10 parts by weight of an antistatic compound; from about 0.5 parts by weight to about 10 parts by weight of a lightfastness compound; and from about 0.5 parts by weight to about 74 parts by weight of colorant.

16. A recording component according to claim 14 wherein the binder is selected from the group consisting of (1) a rubber latex; (2) a polyester latex; (3) an ethylene-vinyl acetate copolymer emulsion; (4) an acrylic-vinyl acetate copolymer emulsion; and (5) a vinyl acrylic terpolymer latex.

17. A recording component according to claim 14 wherein the binder is selected from the group consisting of (1) a poly(ethylene-co-methylacrylate-co-glycidyl methacrylate) copolymer; (2) a poly(ethylene-co-ethylacrylate-co-maleic anhydride) copolymer; (3) a poly(ethylene-co-vinyl acetate-co-carbon monoxide) copolymer; (4) a poly(ethylene-co-vinylacetate)-graft-poly(maleicanhydride) copolymer; and (5) a polystyrene-block-poly(ethylene-random-butylene)-block-polystyrene.

18. A recording component according to claim 14 wherein the luminescent compound is selected from the group consisting of inorganic phosphors, organic phosphors and polymeric phosphors.

19. A recording component according to claim 14 wherein the luminescent compound is optionally present in an amount of from about 30 parts by weight to about 1 parts by weight and is selected from the group consisting of (1) (−)2-methylbutyl-4-(4'-methoxy benzylidene amino) cinnamate; (2) (S)-(+)-2-methylbutyl-4-(4-decyloxy benzylidene amino) cinnamate; (3) ethyl 4-ethoxybenzyl-4'-amino cinnamate; (4) 4-[(S)-(−)-2-ethoxy propoxy]phenyl 4-(decyloxy) benzoate; (5) 4-[(R)-(−)2-chloro-3-methyl butyryloxy]phenyl-4-(decyloxy) benzoate; (6) 4-[(S)-(+)2-chloro-3-methyl butyryloxy]phenyl 4-(decyloxy) benzoate); (7) 4-[(S)-(+)-(4-methyl hexyloxy] phenyl 4-(decyloxy) benzoate; (8) (R)-4-[(1-methylheptyloxy)carbonyl] phenyl4'-octyloxy-4-biphenyl carboxylate; (9) (S)-4-[(1-methylheptyloxy)carbonyl]phenyl-4'-octyloxy-4-biphenyl carboxylate; (10) cholesteryl oleate; and (11) cholesteryl oleyl carbonate.

20. A recording component according to claim 14 wherein the thickness of said colorant layer is from about 0.1 to about 25 microns.

21. A recording device comprised of a substrate, a first hydrophobic toner receiving layer and a second colorant luminescent layer.

22. A recording component in accordance with claim 21 wherein said toner receiving layer is comprised of a hydrophobic polymeric binder, an antistatic compound, a toner wetting compound, a lightfastness compound, an optional lightfastness antioxidant, an optional lightfastness ozonant, and a filler.

23. A recording component in accordance with claim 22 wherein said lightfastness compound is didodecyl-3,3'-thio dipropionate, (2) tris(4-tert-butyl-3-hydroxy-2,6-dimethyl benzyl) isocyanurate, (3) 1,3,5-trimethyl-2,4,6-tris(3,5-di-tert-butyl-4-hydroxybenzyl) benzene, (4) N,N'-β,β'-naphthalene-4-phenylene diamine, or (5) 4,4'-methylene-bis (dibutyl dithio-carbamate), (6) 2,2,4-trimethyl-1,2-hydroquinoline.

24. A recording component in accordance with claim 3 wherein said lightfastness compound is didodecyl-3,3'-thio dipropionate, (2) tris(4-tert-butyl-3-hydroxy-2,6-dimethyl benzyl) isocyanurate, (3) 1,3,5-trimethyl-2,4,6-tris(3,5-di-tert-butyl-4-hydroxybenzyl) benzene, (4) N,N'-β,β'-naphthalene-4-phenylene diamine, or (5) 4,4'-methylene-bis (dibutyl dithio-carbamate), (6) 2,2,4-trimethyl-1,2-hydroquinoline.

25. A recording component in accordances with claim 3 wherein said antioxidant is 1) N,N'-bis(1,4-dimethyl pentyl)-4-phenylene diamine, (2) 2,4,6-tris-(N-1, 4-dimethylpentyl-4-phenylene diamino)-1,3,5-triazine, (3) 6-ethoxy-1,2-dihydro-2,2,4-trimethyl quinoline, or (4) bis-(1,2,3,6-tetrahydrobenzaldehyde) pentaerythritol acetal.

26. A recording component in accordance with claim 1 wherein said component is a sheet.

27. A recording component in accordance with claim 1 wherein said colorant luminscent layer is comprised of a polymer binder, a luminescent compound, an antistatic compound, a lightfastness compound and a filler.

28. A printing process utilizing the recording component of claim 21.

29. A lightfast translucent, or semitransparent recording device or structure comprised of substrate, a toner receiving layer comprised of a binder, a toner wetting agent, or a toner spreading compound, a lightfastness compound, an antistatic compound, and a filler, and a second coating comprised of a binder, a pigment and an antistatic compound.

30. A recording structure in accordance with claim 29 wherein the substrate is a polyester of a thickness of form about 70 to about 125 microns, the toner receiving layer is transparent and which layer is in contact with one side of the substrate, and in said second coating said binder is a film forming binder, and wherein said first and said second coating each further contains a lightfastness compound, and a biocide and where said lightfastness compound is comprised of a mixture of an anioxidant and said lightfastness compound.

31. A recording structure in accordance with claim 29 wherein said receiving layer and said second coating each contains a biocide.

32. A recording component in accordance with claim 1 wherein said receiving layer and said second coating each contains a biocide.

33. A recording component in accordance with claim 1 wherein said component is a sheet, or layered structure.

34. A recording component comprising a substrate situated between a hydrophobic toner receiving layer and an opaque colorant luminescent layer, and wherein said substrate is transparent and is selected from the group consisting of (1) polyethylene terephthalate; (2) polyethylene naphthalates; (3) polysulfones; (4) cellulose triacetate; (5) polyvinylchloride; and (6) polypropylene.

35. A recording component according to claim 34 wherein the toner receiving layer is comprised of a hydrophobic polymeric binder, an antistatic compound, a toner wetting compound, a lightfastness compound, a lightfastness antioxidant, a lightfastness ozonant, optional biocide, and a filler.

36. A recording component according to claim 35 wherein the transparent toner receiving layer is comprised of from about 55 parts by weight to about 83 parts by weight of a hydrophobic binder; the toner wetting compound is present in an amount of from about 22 parts by weight to about 10 parts by weight; the antistatic compound is present in an amount of from about 10 parts by weight to about 1 part by weight; the lightfastness compound is present in an amount of from about 6 parts by weight to about 0.5 part by weight; the lightfastness antioxidant is present in an amount of from about 3 parts by weight to about 0.25 part by weight; the lightfastness antiozonant is present in an amount of from about 3 parts by weight to about 0.25 part by weight; the filler is present in an amount of from about 1 part by weight to about 5 parts by weight, and the total of said components is about 100 percent.

* * * * *